(12) United States Patent
Doering et al.

(10) Patent No.: US 10,960,872 B2
(45) Date of Patent: Mar. 30, 2021

(54) METHODS AND SYSTEM FOR DETERMINING DRIVER DEMAND

(71) Applicant: Ford Global Technologies, LLC, Dearborn, MI (US)

(72) Inventors: Jeffrey Allen Doering, Canton, MI (US); Jason Meyer, Canton, MI (US); Yanan Zhao, Ann Arbor, MI (US); David H. Schmitt, Livonia, MI (US); Xiaoyong Wang, Novi, MI (US); Bradley Dean Riedle, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 180 days.

(21) Appl. No.: 15/656,880

(22) Filed: Jul. 21, 2017

(65) Prior Publication Data

US 2019/0023257 A1 Jan. 24, 2019

(51) Int. Cl.
*B60W 20/00* (2016.01)
*B60W 20/10* (2016.01)
(Continued)

(52) U.S. Cl.
CPC ............... *B60W 20/10* (2013.01); *B60K 6/36* (2013.01); *B60K 6/387* (2013.01); *B60K 6/48* (2013.01); *B60K 6/485* (2013.01); *B60K 6/547* (2013.01); *B60W 10/06* (2013.01); *B60W 10/08* (2013.01); *B60W 30/188* (2013.01); *F16H 61/0213* (2013.01); *F16H 61/688* (2013.01); *F16H 63/50* (2013.01); *B60K 2006/268* (2013.01); *B60K 2006/4808* (2013.01); *B60W 2050/0026* (2013.01); *B60W 2510/1005* (2013.01); *B60W 2520/10* (2013.01); *B60W 2530/10* (2013.01); *B60W 2530/16* (2013.01); *B60W 2540/10* (2013.01); *B60W 2554/00* (2020.02); *B60W 2710/0666* (2013.01); *B60W 2710/083* (2013.01); *B60W 2720/106* (2013.01); *B60W 2720/30* (2013.01); *B60Y 2200/92* (2013.01); *B60Y 2400/428* (2013.01); *F16H 3/006* (2013.01); *F16H 3/093* (2013.01);
(Continued)

(58) Field of Classification Search
CPC .... B60W 20/10; B60W 30/188; B60W 10/08; B60W 10/06; B60W 2720/106; B60W 2720/30; B60W 2540/10; B60W 2550/10; B60W 2530/10; B60W 2520/10; B60W 2510/1005; B60K 6/48; B60K 6/547; B60K 6/36; B60K 2006/4808; F16H 63/50; F16H 3/093; F16H 3/006; B60Y 2200/92
USPC ................ 701/22, 51, 55, 74; 477/3, 5, 174; 475/213; 74/665 F
See application file for complete search history.

(56) References Cited

U.S. PATENT DOCUMENTS 6,379,281 B1 4/2002 Collins et al.
7,143,851 B2 12/2006 Masterson
(Continued)

*Primary Examiner* — Truc M Do
(74) *Attorney, Agent, or Firm* — David Kelley; McCoy Russell LLP

(57) ABSTRACT

Methods and systems are provided for operating a driveline of a hybrid vehicle that includes an internal combustion engine, an electric machine, and a transmission are described. In one example, accelerator pedal position provides a basis for requesting vehicle acceleration and vehicle wheel torque is determined from the requested vehicle acceleration.

16 Claims, 8 Drawing Sheets

(51) Int. Cl.

| | | |
|---|---|---|
| *F16H 61/02* | (2006.01) | |
| *B60K 6/387* | (2007.10) | |
| *B60K 6/485* | (2007.10) | |
| *F16H 61/688* | (2006.01) | |
| *B60K 6/36* | (2007.10) | |
| *B60K 6/48* | (2007.10) | |
| *B60K 6/547* | (2007.10) | |
| *B60W 10/06* | (2006.01) | |
| *B60W 10/08* | (2006.01) | |
| *B60W 30/188* | (2012.01) | |
| *F16H 63/50* | (2006.01) | |
| *B60K 6/26* | (2007.10) | |
| *B60W 50/00* | (2006.01) | |
| *F16H 3/093* | (2006.01) | |
| *F16H 3/00* | (2006.01) | |

(52) U.S. Cl.
CPC ................ *F16H 2003/0931* (2013.01); *F16H 2200/0056* (2013.01)

(56) References Cited

U.S. PATENT DOCUMENTS

| | | | |
|---|---|---|---|
| 7,698,048 B2 | 4/2010 | Jung et al. | |
| 8,160,761 B2 | 4/2012 | Heap et al. | |
| 8,725,335 B2* | 5/2014 | Tolkacz | B60W 10/06 701/22 |
| 9,346,353 B2* | 5/2016 | Stares | B60K 17/34 |
| 2003/0019674 A1* | 1/2003 | Duan | B60K 6/44 180/65.225 |
| 2006/0035749 A1* | 2/2006 | Kanafani | B60W 10/06 477/115 |
| 2008/0293538 A1* | 11/2008 | Saito | B60K 6/365 477/3 |
| 2008/0314661 A1* | 12/2008 | Soliman | B60W 10/18 180/65.245 |
| 2009/0118950 A1* | 5/2009 | Heap | B60K 6/387 701/55 |
| 2009/0221394 A1* | 9/2009 | Phillips | F16H 3/663 475/213 |
| 2010/0025131 A1* | 2/2010 | Gloceri | B60G 3/20 180/65.28 |
| 2010/0114447 A1* | 5/2010 | Moriki | B60K 6/442 701/74 |
| 2011/0178686 A1* | 7/2011 | Morris | B60K 6/445 701/51 |
| 2013/0289811 A1* | 10/2013 | Tolkacz | B60W 10/06 701/22 |
| 2014/0080673 A1* | 3/2014 | Stares | B60K 17/34 477/174 |
| 2016/0031435 A1* | 2/2016 | Gibson | B60W 10/02 477/5 |
| 2016/0052509 A1* | 2/2016 | Yamazaki | B60W 10/08 477/5 |
| 2016/0114787 A1* | 4/2016 | Yang | B60W 10/113 701/22 |
| 2016/0185216 A1* | 6/2016 | Clarke | B60K 17/35 74/665 F |
| 2016/0185338 A1* | 6/2016 | Doering | B60K 6/48 477/3 |
| 2017/0036664 A1* | 2/2017 | Yang | B60W 50/0098 |
| 2017/0282908 A1* | 10/2017 | Pietron | B60K 6/48 |
| 2017/0320389 A1* | 11/2017 | Burt | B60K 17/346 |
| 2017/0349179 A1* | 12/2017 | Cunningham | B60W 10/02 |
| 2017/0361831 A1* | 12/2017 | Johri | B60W 20/50 |
| 2018/0099674 A1* | 4/2018 | Jerger | B60W 30/181 |
| 2019/0001985 A1* | 1/2019 | Jerger | B60W 20/00 |

* cited by examiner

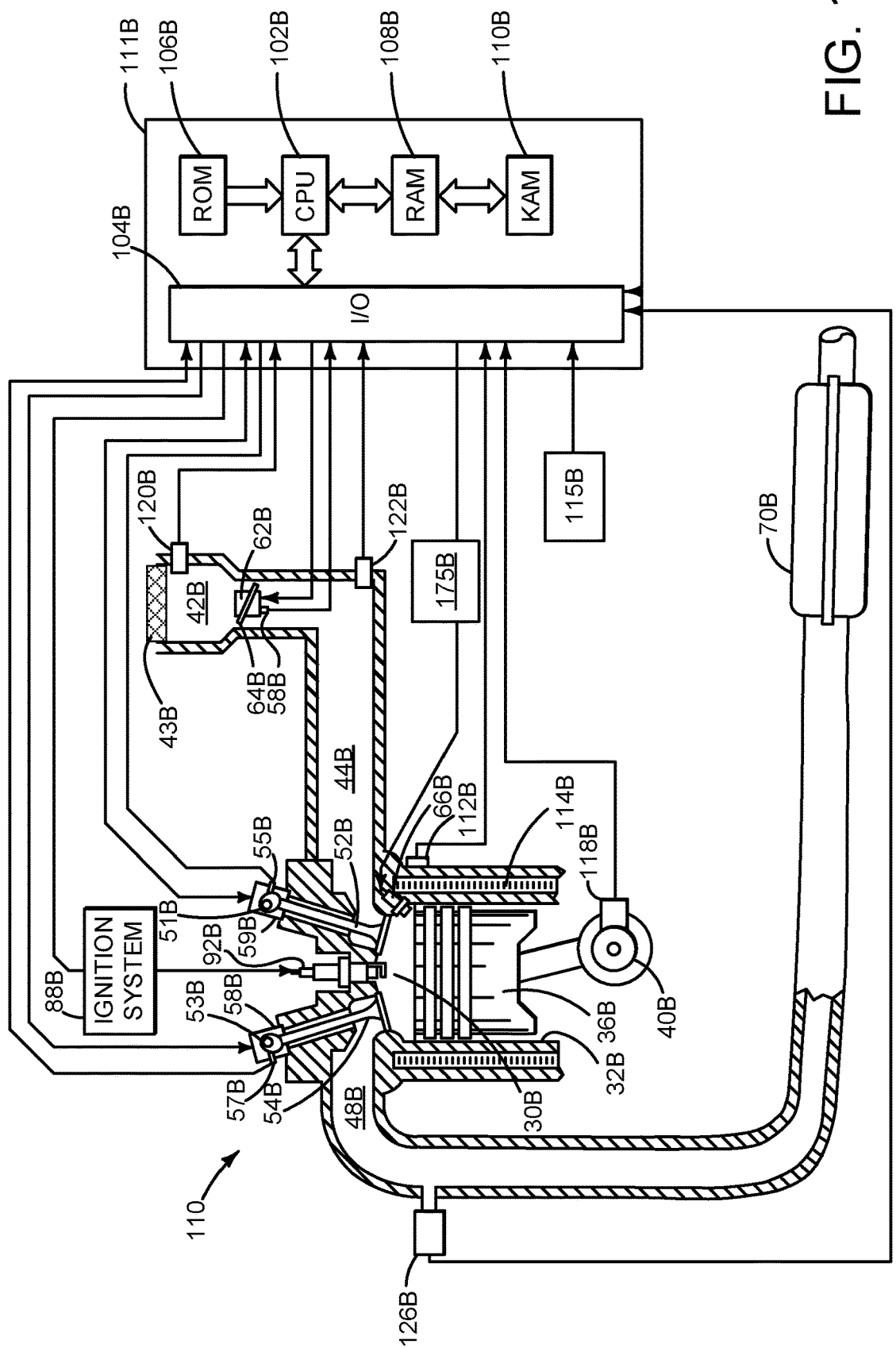

METHODS AND SYSTEM FOR DETERMINING DRIVER DEMAND

FIELD

The present description relates generally to methods and systems for controlling torque of a hybrid vehicle driveline. The methods and systems may be particularly suited for hybrid vehicles that include an engine and a rear drive unit electric machine.

BACKGROUND/SUMMARY

A human driver may request torque from a vehicle via an accelerator pedal. The position of the accelerator pedal may be converted directly from accelerator pedal position into a requested engine torque. The requested engine torque may be provided by opening or closing a throttle, adjusting spark timing, and adjusting an amount of fuel injected to the engine. The engine torque may be output to an input of a transmission. The transmission may transfer torque from the engine to an axle, and the axle may transfer torque from the engine to vehicle wheels. However, a hybrid vehicle may include an electrical machine with the engine to provide requested demand torque. The requested demand torque may be provided in part by the engine and in part by the electric machine. The allocation of torque provided via the engine and the electric machine may be responsive to battery operating conditions, the level of the driver demand torque, and other parameters. Further, the driver demand torque may be provided by simply summing of engine torque and electric machine torque when the engine and electric machine torques are both provided to the transmission input shaft. However, for hybrid vehicles that have an electric machine located downstream of the transmission in a direction of positive torque flow from the powertrain or driveline to vehicle wheels, the driver demand may not be a simple sum of engine output torque and electric machine torque because of gears and clutches of the driveline. Therefore, it may be desirable to provide a way of determining a desired engine torque output and a desired electric machine output that provides the driver demand even when driveline torque sources are separated by driveline components that include gears and clutches.

The inventors herein have recognized the above-mentioned issues and have developed a driveline operating method, comprising: providing a wheel torque in response to a desired vehicle acceleration, the desired vehicle acceleration responsive to accelerator pedal position and present vehicle speed.

By determining a desired vehicle acceleration that is responsive to accelerator pedal position and vehicle speed, it may be possible to determine a desired wheel torque to provide the desired vehicle acceleration. The desired wheel torque may then be separated into portions or fractions and allocated to the various torque sources in the driveline. Torque of the torque sources may be adjusted based on components in between the wheels and the torque sources so that the desired wheel torque and vehicle acceleration may be provided. For example, if the desired wheel torque is 300 N-m and 100 N-m is allocated or to be provided by the electric machine, then torque of the electric machine may be adjusted such that electric machine torque multiplied by the final drive ratio equals 100 N-m. If the remaining 200 N-m of wheel torque is allocated or to be provided by the engine, then engine torque may be adjusted such that engine output torque multiplied by the transmission gear ratio and the final drive ratio equals 200 N-m. In this way, torque provided by the torque sources may be adjusted to provide the requested driver demand even for a hybrid driveline with distributed torque sources.

The present description may provide several advantages. Specifically, the approach may respond consistently to a driver demand even in different hybrid vehicle operating modes. Further, the approach allows a driver demand torque to be followed consistently even with different driveline configurations. Additionally, the approach may reduce driveline torque disturbances since it considers driveline inertia responsive to hybrid vehicle operating mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B is a sketch of an engine of the hybrid vehicle driveline;

DETAILED DESCRIPTION

Figure 4:
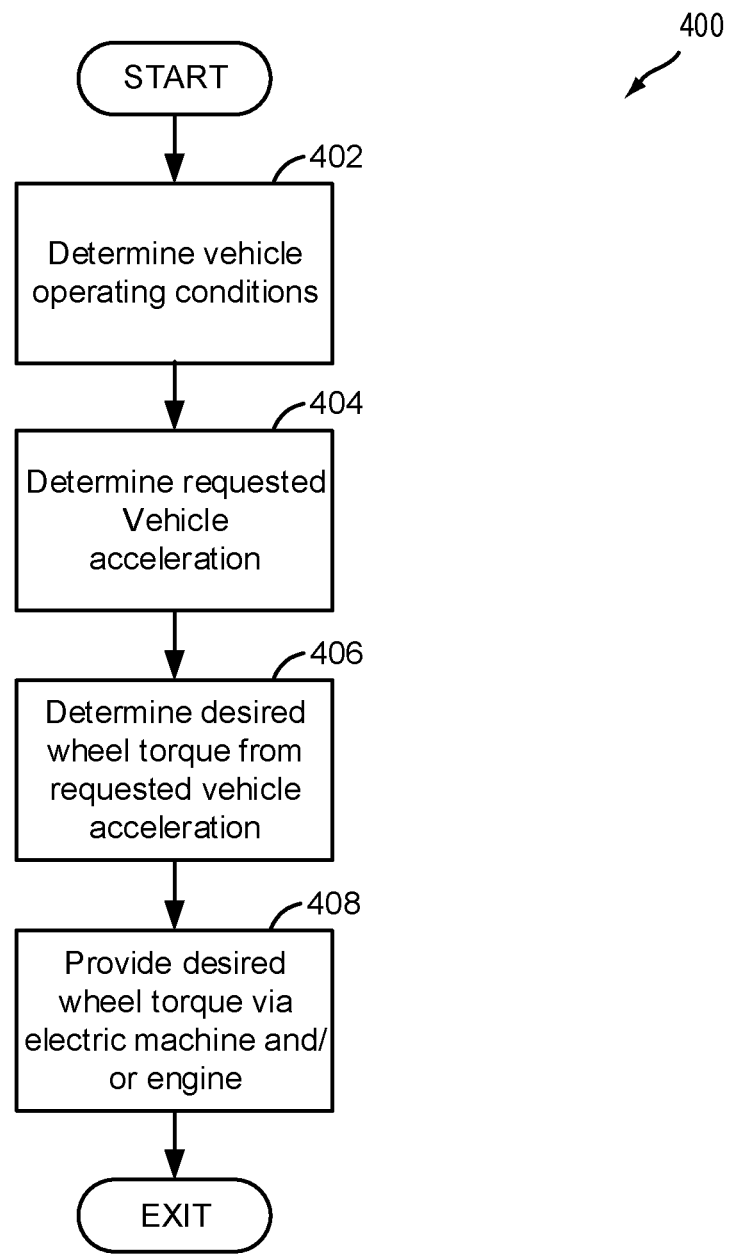
FIG. 4 is a flowchart of a method for determining a desired wheel torque.
Figure 5:
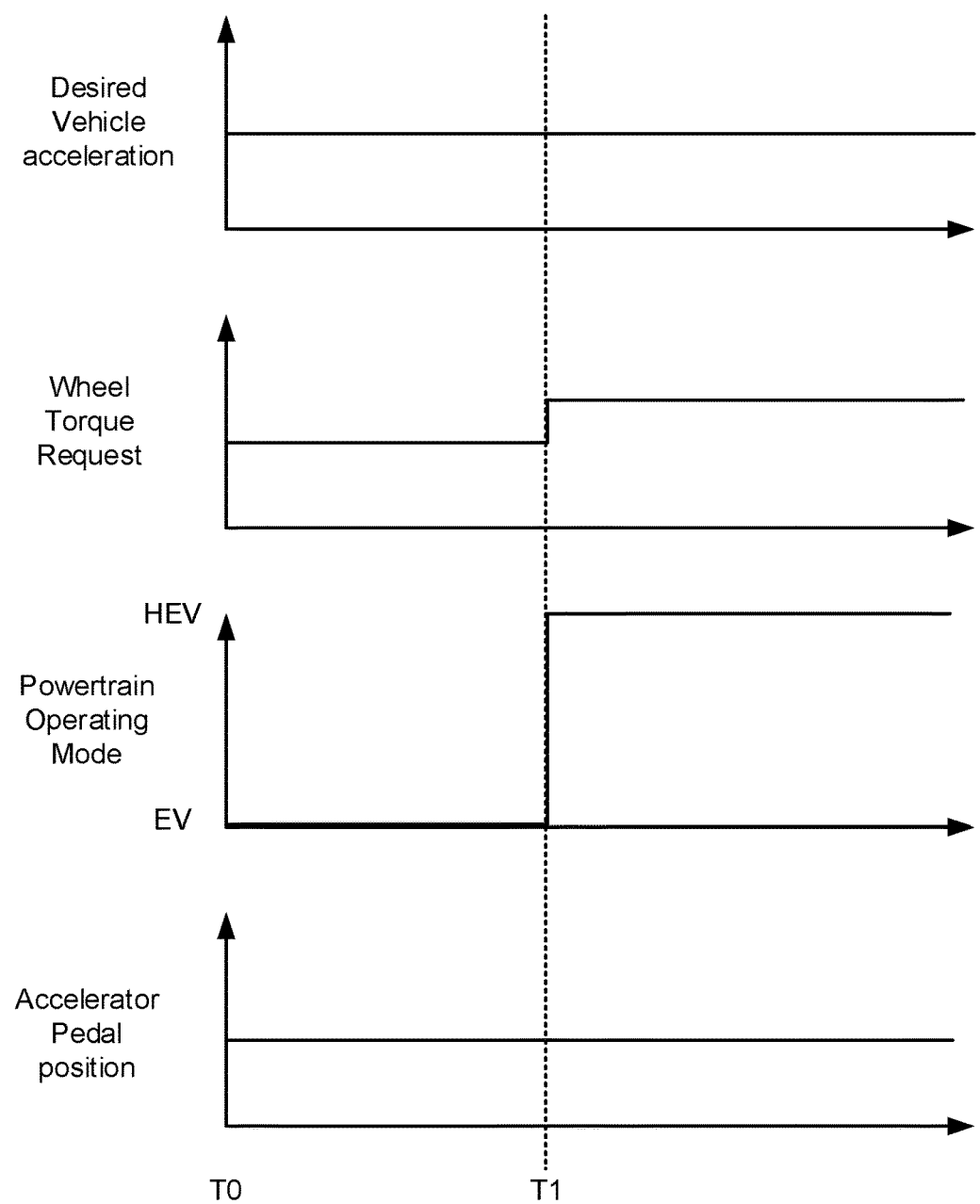
FIG. 5 is a plot of a prophetic driveline operating sequence according to the method of FIG. 4.
Figure 6:
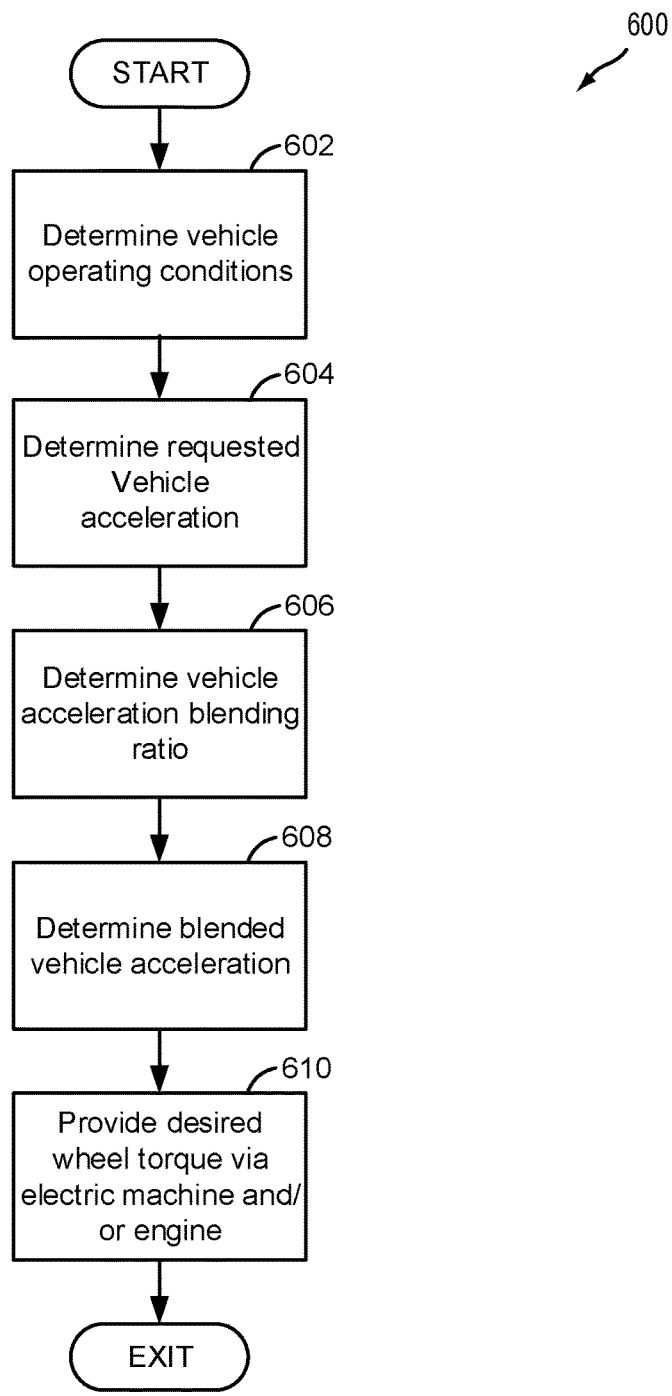
FIG. 6 is a flowchart of a method for determining a desired vehicle acceleration.
Figure 7:
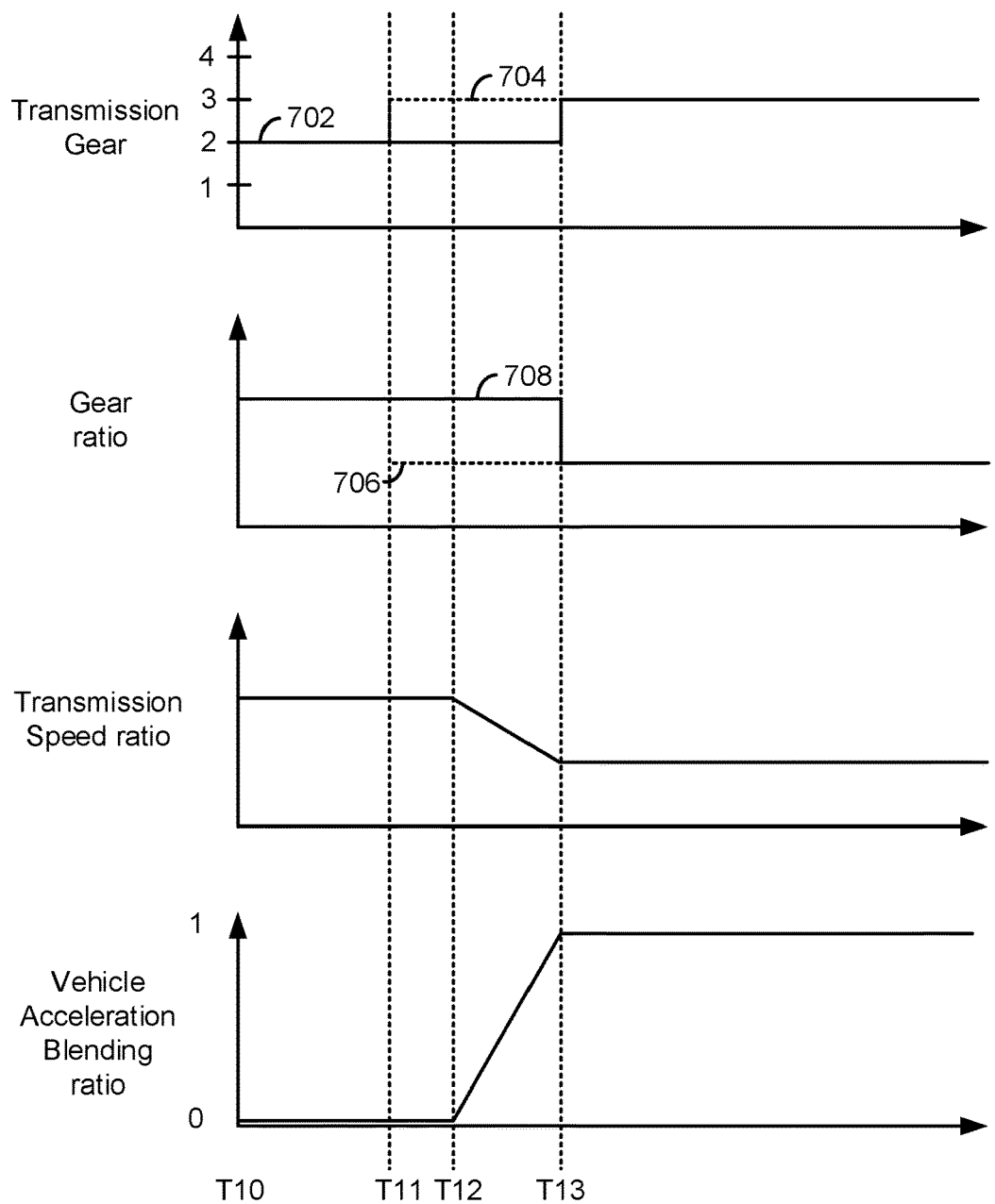
FIG. 7 is a plot of a prophetic driveline operating sequence according to the method of FIG. 6.

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. A method for determining a desired wheel torque that is not restricted to a particular driveline configuration is shown in FIG. 4. A prophetic driveline operating sequence according to the method of FIG. 4 is shown in FIG. 5. A flowchart of a method for determining desired vehicle acceleration is shown in FIG. 6. A driveline operating sequence according to the method of FIG. 6 is shown in FIG. 7.

Figure 1A:
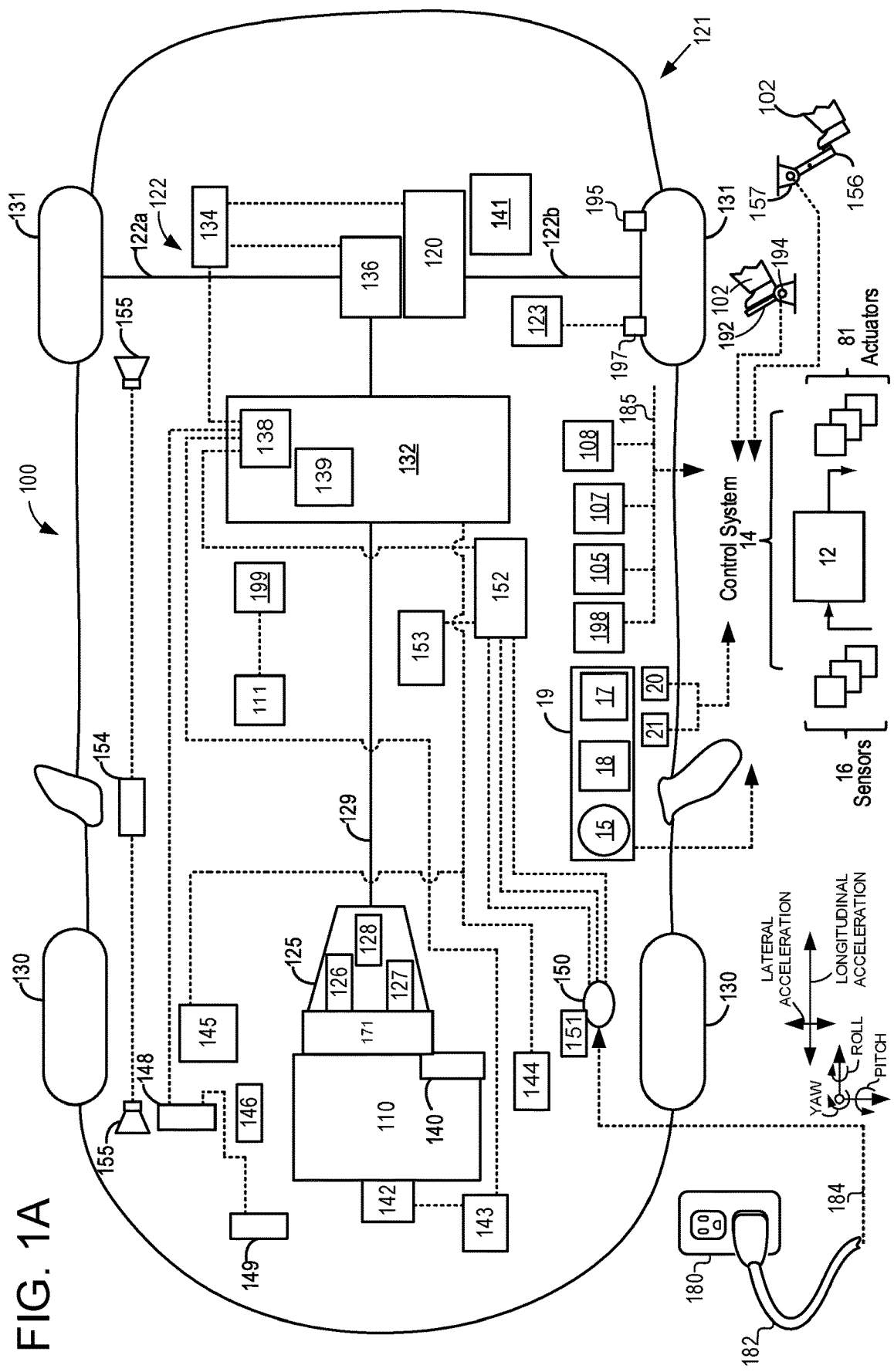
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131. Rear drive unit 136 may include electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120, integrated starter/generator 142, or optional integrated starter/generator 171. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, electric machine 120, energy storage device 132, integrated starter/generator 142, optional integrated starter/generator 171, transmission 125, etc. Control system 14 may receive sensory feedback information from one or more of engine 110, electric machine 120, energy storage device 132, integrated starter/generator 142, optional integrated starter/generator 171, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g., 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142 or an optional integrated starter/generator. BISG and/or optional integrated starter/generator may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142 or optional integrated starter/generator 171, and may convert alternating current generated by BISG 142 or optional integrated starter/generator 171 to direct current for storage at energy storage device 132. Integrated starter/generator 142 or optional integrated starter/generator 171 may also provide torque to engine 110 during engine starting or other conditions to supplement engine torque. Optional integrated starter/generator 171 may be directly coupled to engine 110 via engine crankshaft 40B.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
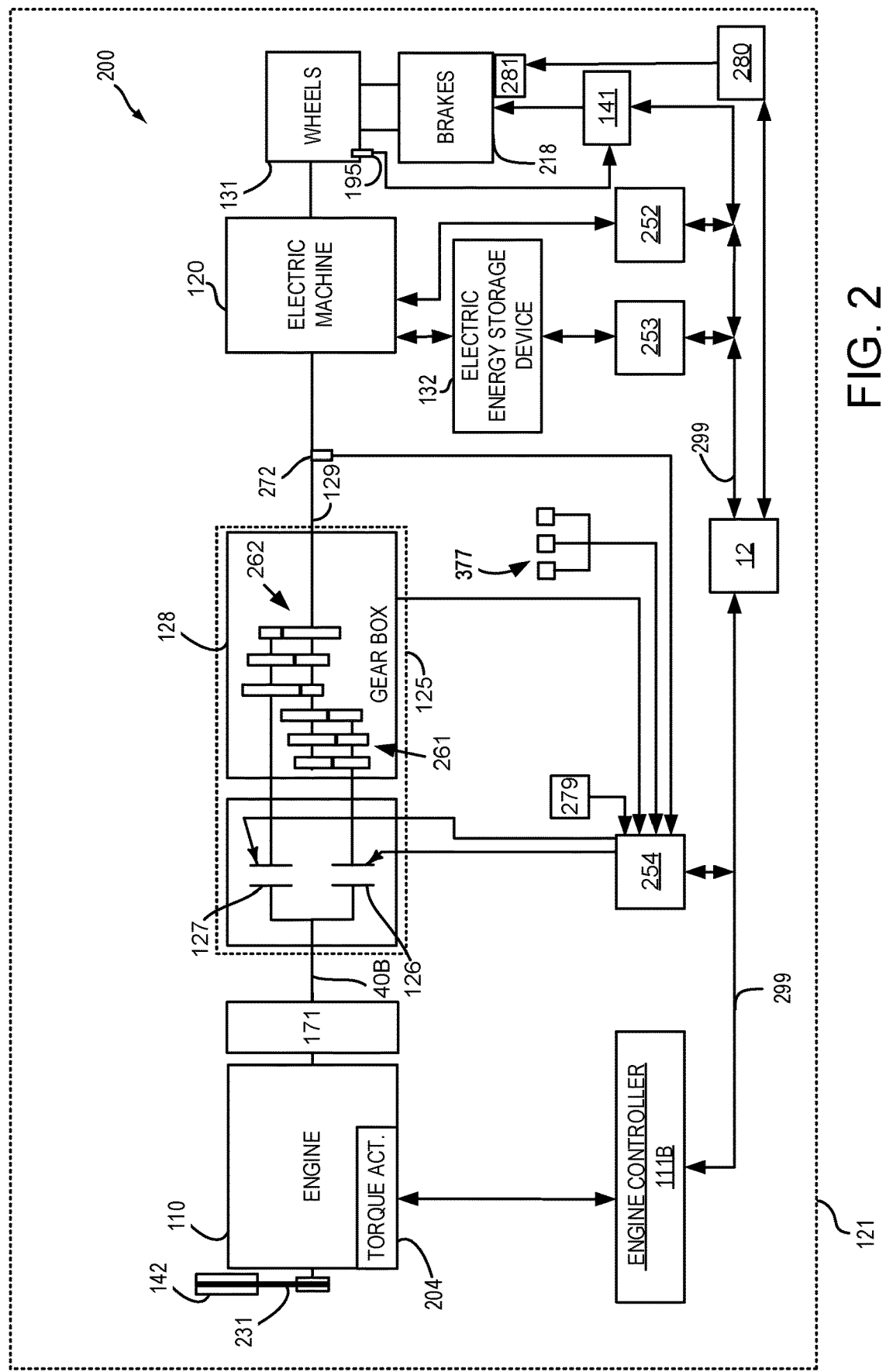
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110, and/or electric machine 120, and optional integrated starter/generator 171. In other examples, engine 110 may be omitted. Engine 110 may be started with an engine starter (e.g. 140), via belt integrated starter/generator (BISG) 142, or optional integrated starter/generator 171, or via electric machine 120. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream if transmission 125. Transmission 125 is positioned upstream of electric machine 120, and BISG 142 may be positioned upstream of engine 110, or downstream of engine 110 and upstream of transmission 125.

Figure 3:
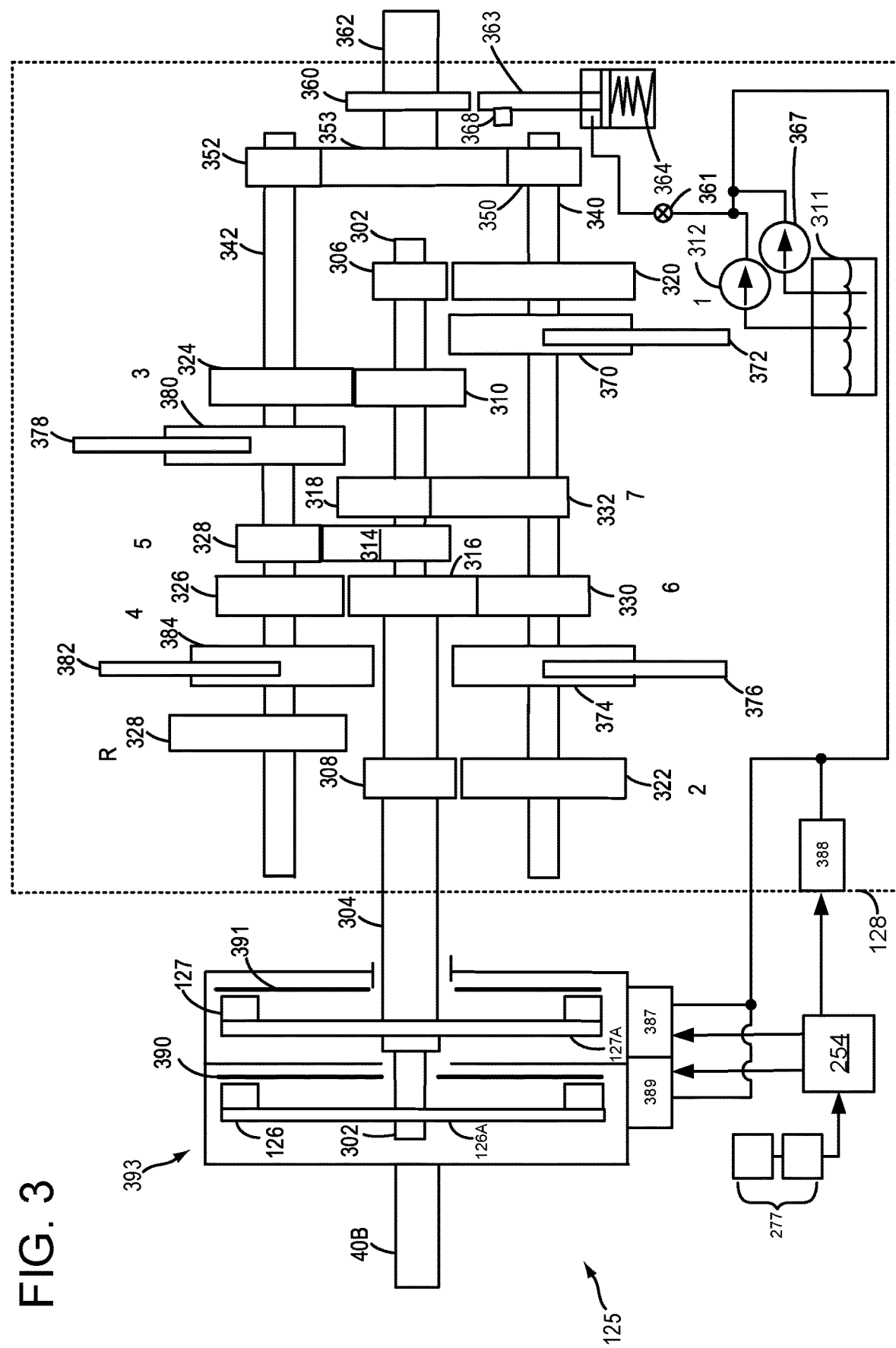
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 493 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 340 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 328. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples. Thus, the system of FIGS. 1A-3 provides for a system, comprising: an engine; an integrated starter/generator coupled to the engine; a transmission including a first input clutch, a second input clutch, a first input shaft and a second input shaft, a first layshaft selectively coupled to the first input shaft, a second layshaft selectively coupled to the second input shaft, a plurality of gears, and an output shaft coupled to the first and second layshafts; a rear drive unit including a rear axle and an electric machine coupled to the dual clutch transmission via a driveshaft; and a controller including executable instructions stored in non-transitory memory to provide a wheel torque in response to a desired vehicle acceleration, the desired vehicle acceleration responsive to accelerator pedal position, present vehicle speed, and presently engaged transmission gear. The system further comprises additional instructions to provide the wheel torque via the electric machine included in the rear drive unit. The system further comprises additional instructions to adjust to provide the wheel torque via the engine. The system includes where the desired vehicle acceleration is a portion of a vehicle acceleration rate in a first gear and a portion of a vehicle acceleration in a second gear. The system further comprises additional instructions to reference a lookup table via the accelerator pedal position, present vehicle speed, and presently engaged transmission gear. The system further comprises additional instructions to convert the desired vehicle acceleration into the wheel torque.

Referring now to FIG. 4, a flowchart of a method for controlling a vehicle driveline is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may be determined via the various sensors described in FIGS. 1A-3 or via inference from output of the sensors. Vehicle operating conditions may include but are not limited to vehicle speed, accelerator pedal position, transmission speed ratio, presently engaged transmission gear, desired transmission gear, vehicle operating mode, road conditions, and vehicle load. The transmission speed ratio may be determined via dividing the transmission input speed by the transmission output speed. The road conditions may include road grade, which may be determined via maps stored in controller memory or a global positioning system. Method 400 proceeds to 404.

At 404, method 400 determines requested vehicle acceleration. In one example, a map or table of values is indexed or referenced via accelerator pedal position and vehicle speed. The map or table outputs empirically determined values of vehicle acceleration. For example, if the accelerator pedal is applied ten percent of full scale and vehicle speed is 20 KPH, the table or map may output a vehicle acceleration rate of 2.5 KPH/s. Method 400 proceeds to 406.

At 406, method 400 determines wheel torque from the desired vehicle acceleration rate. In one example, method 400 determines wheel torque via the following equations:

$$Tq_{whl} = F \cdot R$$

$$F = \left(\frac{J_{eqv}}{R^2} + m_{veh}\right) Acc_{des} + m_{veh} \cdot g \cdot \sin\theta + m_{veh} \cdot g \cdot c_{rr} + 0.5 \rho Veh_{spd}^2 \cdot c_d \cdot A$$

$$J_{eqv} = J_{eng} \cdot Rt_{trn}^2 \cdot Rt_{fd}^2 \, (D_{mode} == HEV) + J_{is1} \cdot R_{is1}^2 \cdot Rt_{fd}^2 + J_{is2} \cdot R_{is2}^2 \cdot Rt_{fd}^2 + J_{whl}$$

where $Tq_{whl}$ is wheel torque, F is force applied to the wheel, R is the tire radius, $J_{eqv}$ is equivalent inertia of driveline rotary components, $M_{veh}$ is mass of the vehicle, $Acc_{des}$ is the desired vehicle acceleration from step 404, g is gravity constant, θ is road angle, $c_{rr}$ is coefficient of rolling resistance, ρ is density of air, Vehspd is vehicle speed, $c_d$ is coefficient of drag of the vehicle, A is frontal area of the vehicle, $Rt_{trn}$ is the ratio of the transmission with the presently engaged transmission gear, $Rt_{fd}$ is the ratio of the final drive (e.g., axle), $J_{is1}$ is an inertia of a first transmission input shaft, $R_{is1}$ is the ratio of the engaged or pre-selected gear coupled to the first input shaft, $J_{is2}$ is inertia of the second transmission input shaft, $R_{is2}$ is the ratio of the engaged or pre-selected gear coupled to the second input shaft, and $J_{whl}$ the effective wheel inertia including wheel inertia, output shaft inertia, and RDU electric machine inertia. The first term of $J_{eqv}$ may be disregarded or made zero if the vehicle is not operating in a hybrid mode with engine coupled to the transmission. In some examples, $J_{eng}$ may be lumped with ISG inertia. Method 400 proceeds to 408.

At 408, method 400 provides the desired wheel torque. The desired wheel torque may be provided via the rear drive unit (RDU) electric machine, the engine, ISG, or BISG. The desired wheel torque may be provided by a combination of the RDU electric machine and engine, the RDU electric machine and the ISG, the RDU electric machine and BISG, the engine and the ISG, or the engine and the BISG. In one example, a portion of the desired wheel torque is allocated to each torque source (e.g., engine, ISG, BISG, RDU electric machine). The portion allocated to each torque source may be a function of battery state of charge, the amount of the desired wheel torque, battery temperature, RDU temperature, and other parameters. The torque sources then provide the desired wheel torque compensating for gear ratios and clutch torque capacities. For example, if the desired wheel torque is 500 N-m and the engine and the RDU electric machine are each requested to provide 250 N-m of wheel torque, then the RDU electric machine provides $250/R_{fd\_rdu}$ N-m of torque, where $R_{fd\_rdu}$ is the final drive ratio of the RDU. The engine provides $250/(R_{fd} \cdot R_{trn})$ N-m of torque. Method 400 proceeds to exit.

In this way, acceleration pedal position may be converted into a desired vehicle acceleration and the desired vehicle acceleration may be converted to a desired wheel torque that may be provided via driveline torque sources. The method may be applied to driveline configurations different than those disclosed herein. As such, the presently disclosed driveline configuration does not limit the scope of the disclosure.

Turning to FIG. 5, a prophetic hybrid vehicle driveline operating sequence is shown. The operating sequence of FIG. 5 may be provided via the system of FIGS. 1A-3 in cooperation with the method of FIG. 4. The plots shown in FIG. 5 occur at the same time and are aligned in time. Vertical lines T0-T1 represent times of interest during the driveline operating sequence. The sequence of FIG. 5 illustrates how desired vehicle acceleration may be maintained in response to a change in hybrid vehicle operating mode.

The first plot from the top of FIG. 5 is a plot of desired vehicle acceleration versus time. The vertical axis represents desired vehicle acceleration and desired vehicle acceleration increases in the direction of the vertical axis arrow. The horizontal axis represents time and time increases from the left side of the figure to the right side of the figure.

The second plot from the top of FIG. 5 is a plot of requested wheel torque versus time. The vertical axis represents requested wheel and requested wheel torque increases in the direction of the vertical axis arrow. The horizontal axis represents time and time increases from the left side of the figure to the right side of the figure.

The third plot from the top of FIG. 5 is a plot of powertrain or driveline operating mode versus time. The vertical axis represents powertrain operating mode and the powertrain is in electric vehicle mode (e.g., operating without the engine) when the trace is at the EV level. The powertrain is in the hybrid vehicle mode (e.g., operating with the engine) when the trace is at the HEV level. The horizontal axis represents time and time increases from the left side of the figure to the right side of the figure.

The fourth plot from the top of FIG. 5 is a plot of accelerator pedal position versus time. The vertical axis represents accelerator pedal position and accelerator pedal position increases in the direction of the vertical axis arrow. The horizontal axis represents time and time increases from the left side of the figure to the right side of the figure.

At time T0, the accelerator pedal position is at a middle level. The desired vehicle acceleration is also at a middle level and the powertrain is operating in electric vehicle only mode without the engine being active. The engine is not coupled to the transmission shaft when the engine is not active. Therefore, the engine's inertia is not part of the rotating driveline propelling the vehicle.

At time T1, the vehicle's operating mode changes from electric vehicle only mode to hybrid vehicle mode with the engine operating. The mode change may be facilitated by a low state of battery charge or other condition (not shown). However, the mode change is not responsive to a change in accelerator pedal position since accelerator position has not changed since time T0. The desired vehicle acceleration remains constant and the wheel torque increases to compensate for the engine's inertia which is added to the driveline when the vehicle enters hybrid mode.

In this way, a desired wheel torque may be adjusted to compensate for vehicle mode changes that add or subtract inertia from the vehicle's driveline. As such, the wheel torque may change to maintain a desired level of vehicle acceleration.

Referring now to FIG. 6, a flowchart of a method for controlling a vehicle driveline is shown. The method of FIG. 6 may be incorporated into and may cooperate with the system of FIGS. 1A-3. Further, at least portions of the method of FIG. 6 may be incorporated as executable instructions stored in non-transitory memory while other portions of the method may be performed via a controller transforming operating states of devices and actuators in the physical world. Desired vehicle acceleration may be determined via the method of FIG. 6 when the vehicle is operating in a hybrid mode with the engine combusting air and fuel.

At 602, method 600 determines vehicle operating conditions. Vehicle operating conditions may be determined via the various sensors described in FIGS. 1A-3 or via inference from output of the sensors. Vehicle operating conditions may include but are not limited to vehicle speed, accelerator pedal position, transmission speed ratio, presently engaged transmission gear, desired transmission gear, vehicle operating mode, road conditions, and vehicle load. The transmission speed ratio may be determined via dividing the transmission input speed by the transmission output speed. The road conditions may include road grade, which may be determined via maps stored in controller memory or a global positioning system. The desired gear is a gear that the transmission may seek to engage in response to vehicle operating conditions. Method 600 proceeds to 604.

At 604, method 600 determines two requested vehicle accelerations. In one example, the first vehicle acceleration (e.g., Acc_Gear) is determined via a first map or table of values that are indexed or referenced via accelerator pedal position, vehicle speed, and presently engaged transmission gear. The map or table outputs empirically determined values of vehicle acceleration. For example, if the accelerator pedal is applied ten percent of full scale, vehicle speed is 20 KPH, and the transmission is engaged in second gear, the table or map may output a vehicle acceleration rate of 2.5 KPH/s. The second vehicle acceleration (e.g., Acc_TrgGear) is determined via a second map or table of values that are indexed or referenced via accelerator pedal position, vehicle speed, and desired transmission gear. The map or table outputs empirically determined values of vehicle acceleration. For example, if the accelerator pedal is applied ten percent of full scale, vehicle speed is 20 KPH, and the desired transmission gear is third gear, the table or map may output a vehicle acceleration rate of 1.5 KPH/s. By including gear ratios in the determining of vehicle accelerations, the vehicle acceleration estimates may be improved. Method 600 proceeds to 606.

At 606, method 600 determines a vehicle acceleration blending ratio parameter. In one example, the vehicle acceleration blending ratio is determined via the following equation:

$$Rt\_Blend = \frac{(Rt\_TrnsSpd - Rt\_CurGear)}{(Rt\_TrgGear - Rt\_CurGear)}$$

where Rt_Blend is the vehicle acceleration blending ratio parameter, Rt_TrnsSpd is the transmission speed ratio, Rt_CurGear is the ratio of the presently engaged transmission gear, and Rt_TrgGear is the desired transmission gear. Method 600 proceeds to 608.

At 608, method 600 determines desired vehicle acceleration. In one example, method 600 determines desired vehicle acceleration from the following equation:

$$Acc\_dsd = (1 - Rt\_Blend) \cdot Acc\_Gear + Rt\_Blend \cdot Acc\_TrgGear$$

where Acc_dsd is the desired vehicle acceleration, Rt_Blend is the blending ratio parameter, Acc_Gear is the first vehicle acceleration (e.g., acceleration of the vehicle in a first gear) as determined at 604, and Acc_TrgGear is the second vehicle acceleration (e.g., acceleration of the vehicle in a second gear) as determined at 604. By blending the two accelerations into a single acceleration, driveline torque disturbances may be reduced. Method 600 proceeds to 610.

At 610, method 600 determines desired wheel torque and provides the desired wheel torque. The desired wheel torque may be determined as described at 406 of method 400.

The desired wheel torque may be provided via the rear drive unit (RDU) electric machine, the engine, ISG, or BISG. The desired wheel torque may be provided by a combination of the RDU electric machine and engine, the RDU electric machine and the ISG, the RDU electric machine and BISG, the engine and the ISG, or the engine and the BISG. In one example, a portion of the desired wheel torque is allocated to each torque source (e.g., engine, ISG, BISG, RDU electric machine). The portion allocated to each torque source may be a function of battery state of charge, the amount of the desired wheel torque, battery temperature, RDU temperature, and other parameters. The torque sources then provide the desired wheel torque compensating for gear ratios and clutch torque capacities.

In this way, acceleration pedal position, vehicle speed, and transmission gear ratio may be used to determine desired vehicle acceleration and the desired vehicle acceleration may be converted to a desired wheel torque that may be provided via driveline torque sources. The method may be applied to driveline configurations different than those disclosed herein. As such, the presently disclosed driveline configuration does not limit the scope of the disclosure.

Referring now to FIG. 7, a prophetic hybrid vehicle driveline operating sequence is shown. The operating sequence of FIG. 7 may be provided via the system of FIGS. 1A-3 in cooperation with the method of FIG. 6. The plots shown in FIG. 7 occur at the same time and are aligned in time. Vertical lines T10-T12 represent times of interest during the driveline operating sequence. The sequence of FIG. 7 illustrates how desired vehicle acceleration may progress during a power on (e.g., accelerator pedal applied) transmission gear upshift.

The first plot from the top of FIG. 7 is a plot of transmission gear versus time. The vertical axis represents transmission gear and the transmission gear numbers are indicated along the vertical axis. Solid line 702 represents presently engaged transmission gear and dashed line 704 represents desired transmission gear. The desired transmission gear and the presently engaged transmission gear are a same gear when only solid trace 702 is visible. The desired transmission gear is a gear that the controller plans to engage at a later time. The horizontal axis represents time and time increases from the left side of the figure to the right side of the figure.

The second plot from the top of FIG. 7 is a plot of transmission gear ratio versus time. The vertical axis represents transmission gear ratio and gear ratio increases in the direction of the vertical axis arrow. The horizontal axis represents time and time increases from the left side of the figure to the right side of the figure. Solid line 708 represents the ratio of the presently engaged gear. Dashed line 706 represents the ratio of the desired gear. The desired transmission gear ratio and the presently engaged transmission gear ratio are a same gear when only solid trace 708 is visible. The desired transmission gear ratio is a gear ratio that the controller plans to engage at a later time.

The third plot from the top of FIG. 7 is a plot of transmission speed ratio versus time. The vertical axis represents transmission speed ratio and transmission speed ratio increases in the direction of the vertical axis arrow. The horizontal axis represents time and time increases from the left side of the figure to the right side of the figure.

The fourth plot from the top of FIG. 7 is a plot of vehicle acceleration blending ratio versus time. The vertical axis represents vehicle acceleration blending ratio and the vehicle acceleration blending ratio values are located along the vertical axis. The horizontal axis represents time and time increases from the left side of the figure to the right side of the figure.

At time T10, second gear of the transmission is engaged and the desired transmission gear is second gear. The desired transmission gear ratio and the present transmission gear ratio are a same higher gear ratio, the ratio of second gear. The transmission speed ratio is a higher value and the vehicle acceleration blending ratio is zero.

At time T11, the desired transmission gear changes from second gear to third gear and the desired transmission gear ratio changes from a higher value to a lower value to indicate the ratio difference between second gear and third gear. The desired gear ratio may change in response to vehicle speed increasing and approaching a speed where a second gear to third gear shift is made. The transmission speed ratio remains at it previous value and the vehicle acceleration blending value remains at zero since the gear shift has not started.

At time T12, the gear change from second gear to third gear is in progress and the transmission speed ratio starts to decrease. The vehicle acceleration blending ratio also begins to increase. The transmission remains in second gear and the transmission gear ratio remains unchanged. The desired transmission gear is third gear and the desired transmission gear ratio is the gear ratio of third gear.

Between time T12 and time T13, the vehicle acceleration blending ratio increases from a value of zero to a value of one. By changing the value of the acceleration blending ratio, a larger portion of the requested vehicle acceleration at the beginning of the gear shift is responsive to the vehicle acceleration based on the transmission being engaged in second gear. However, at the end of the gear shift, the requested vehicle acceleration is responsive only to the vehicle acceleration in the third gear.

At time T13, the shift from second gear to third gear completes. The desired transmission gear and the presently engaged transmission gear is third gear. The desired transmission gear ratio and present transmission gear ratio are a same value. The transmission speed ratio is a lower value corresponding to third gear and the vehicle acceleration blending ratio is a value of one.

In this way, the desired vehicle acceleration may be adjusted responsive to the engaged transmission gear. During a gear shift, the desired vehicle acceleration is adjusted responsive to the gear being disengaged and the gear being engaged.

Thus, the methods of FIGS. 4 and 6 provide for a driveline operating method, comprising: providing a wheel torque in response to a desired vehicle acceleration, the desired vehicle acceleration responsive to accelerator pedal position and present vehicle speed. The method includes where the wheel torque is provided via an engine and an electric machine. The method further comprises outputting the desired vehicle acceleration from a lookup table, the lookup table referenced via the accelerator pedal position and the present vehicle speed. The method further comprises converting the desired vehicle acceleration into the wheel torque. The method includes where converting the desired vehicle acceleration into wheel torque includes adjusting the wheel torque estimate responsive to driveline rotating inertia, and where the driveline rotating inertia changes with vehicle operating mode. The method includes where converting the desired vehicle acceleration into wheel torque includes adjusting the wheel torque estimate responsive to a frontal area of a vehicle and mass of the vehicle. The method includes where converting the desired vehicle acceleration into wheel torque includes adjusting the wheel torque estimate responsive to a coefficient of rolling resistance of a wheel.

The method of FIGS. 4 and 6 also provides for a driveline operating method, comprising: providing a wheel torque in response to a desired vehicle acceleration, the desired vehicle acceleration responsive to accelerator pedal position, present vehicle speed, and presently engaged transmission gear. The method includes where the desired vehicle acceleration is a portion of a vehicle acceleration rate in a first gear and a portion of a vehicle acceleration in a second gear. The method includes where the portion of the vehicle acceleration rate in the first gear and the portion of the vehicle acceleration in the second gear is responsive to a blending ratio. In some examples, the method also includes where the blending ratio is based on a transmission speed ratio. The method includes where the desired vehicle acceleration is further responsive to a transmission speed ratio. The method further comprises referencing a lookup table via the accelerator pedal position, present vehicle speed, and presently engaged transmission gear. The method includes where the lookup table outputs vehicle acceleration in a desired transmission gear. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
providing a wheel torque in response to a desired vehicle acceleration, the desired vehicle acceleration responsive to accelerator pedal position, transmission gear, and present vehicle speed, the desired vehicle acceleration provided by adjusting an engine output and an electric machine output, an electric machine located downstream of a transmission in a direction of positive torque flow starting at an engine and ending at a vehicle wheel, where, as a transmission speed ratio changes, desired vehicle acceleration is blended via a blending ratio from a vehicle acceleration rato in a first gea r to a vehicle acceleration in a second gear proportional to the transmission speed ratio change, and where the blending ratio is based on the transmission speed ratio.

2. The method of claim 1, where the wheel torque is provided via the engine and the electric machine, and where a larger portion of desired vehicle acceleration at a beginning of the transmission speed ratio change is responsive to the vehicle acceleration based on a starting gear and, at an end of the transmission speed ratio change, the desired vehicle acceleration is responsive only to vehicle acceleration in an ending gear.

3. The method of claim 2, further comprising outputting the desired vehicle acceleration from a lookup table, the lookup table referenced via the accelerator pedal position and the present vehicle speed.

4. The method of claim 3, further comprising converting the desired vehicle acceleration into the wheel torque based on an inertia of the engine, inertia of a first transmission input shaft, and inertia of a second transmission input shaft.

5. The method of claim 4, where converting the desired vehicle acceleration into the wheel torque includes adjusting a wheel torque estimate responsive to driveline rotating inertia, and where the driveline rotating inertia changes with a vehicle operating mode.

6. The method of claim 5, where converting the desired vehicle acceleration into the wheel torque includes adjusting the wheel torque estimate responsive to a frontal area of a vehicle and a mass of the vehicle.

7. The method of claim 6, where converting the desired vehicle acceleration into the wheel torque includes adjusting the wheel torque estimate responsive to a coefficient of rolling resistance of the vehicle wheel.

8. A driveline operating method, comprising:
providing a wheel torque in response to a desired vehicle acceleration, the desired vehicle acceleration responsive to accelerator pedal position, present vehicle speed, and presently engaged transmission gear, the desired vehicle acceleration provided by adjusting an engine output and an electric machine output, an electric machine located downstream of a transmission in a direction of positive torque flow beginning at an engine and ending at a vehicle wheel, where the desired vehicle acceleration is a blended portion of a vehicle acceleration in a first gear and a portion of a vehicle acceleration in a second gear as a transmission speed ratio changes, where the portion of the vehicle acceleration in the first gear and the portion of the vehicle acceleration in the second gear are responsive to a blending ratio, and where the blending ratio is based on the transmission speed ratio.

9. The method of claim 8, where the desired vehicle acceleration is further responsive to the transmission speed ratio.

10. The method of claim 8, further comprising referencing a lookup table via the accelerator pedal position, present vehicle speed, and presently engaged transmission gear.

11. The method of claim 10, where the lookup table outputs vehicle acceleration in a desired transmission gear, and further comprising converting the desired vehicle acceleration into the wheel torque based on an inertia of the engine, inertia of a first transmission input shaft, and inertia of a second transmission input shaft.

12. A system, comprising:
an engine;
an integrated starter/generator coupled to the engine;
a transmission including a first input clutch, a second input clutch, a first input shaft and a second input shaft, a first layshaft selectively coupled to the first input shaft, a second layshaft selectively coupled to the second input shaft, a plurality of gears, and an output shaft coupled to the first and second layshafts;
a rear drive unit including a rear axle and an electric machine coupled to the transmission via a driveshaft; and
a controller including executable instructions stored in non-transitory memory to provide a wheel torque in response to a desired vehicle acceleration, the desired vehicle acceleration responsive to an accelerator pedal position, present vehicle speed, and presently engaged transmission gear, the controller further including additional instructions to determine the desired vehicle acceleration as a portion of a vehicle acceleration in a first gear and a portion of a vehicle acceleration in a second gear where the portion of the vehicle acceleration in the first gear and the portion of the vehicle acceleration in the second gear are responsive to a blending ratio, and where the blending ratio is based on the transmission speed ratio.

13. The system of claim 12, further comprising additional instructions to provide the wheel torque via the electric machine included in the rear drive unit.

14. The system of claim 12, further comprising additional instructions to adjust the wheel torque via the engine.

15. The system of claim 12, further comprising additional instructions to reference a lookup table via the accelerator pedal position, present vehicle speed, and presently engaged transmission gear.

16. The system of claim 15, further comprising additional instructions to convert the desired vehicle acceleration into the wheel torque.

\* \* \* \* \*